US008921764B2

(12) United States Patent
Loftus et al.

(10) Patent No.: US 8,921,764 B2
(45) Date of Patent: Dec. 30, 2014

(54) DEVICE FOR PRODUCING LASER-COOLED ATOMS

(75) Inventors: Thomas H. Loftus, Los Gatos, CA (US); Artyom Vitouchkine, Redwood City, CA (US); Michael R. Matthews, Mountain View, CA (US); Adam T. Black, Mountain View, CA (US); Igor Teper, Redwood City, CA (US); Leo W. Hollberg, Portola Valley, CA (US); Todd L. Gustavson, Sunnyvale, CA (US); Brent C. Young, Menlo Park, CA (US)

(73) Assignee: AOSense, Inc., Sunnyvale, CA (US)

( * ) Notice: Subject to any disclaimer, the term of this patent is extended or adjusted under 35 U.S.C. 154(b) by 77 days.

(21) Appl. No.: 13/603,287

(22) Filed: Sep. 4, 2012

(65) Prior Publication Data

US 2014/0061454 A1    Mar. 6, 2014

(51) Int. Cl.
*H05H 3/02* (2006.01)

(52) U.S. Cl.
USPC ........................................................ 250/251

(58) Field of Classification Search
CPC .......... G21K 1/00; G21K 1/003; G21K 1/006
USPC ................. 250/282, 292, 290, 287, 281, 251; 335/306
See application file for complete search history.

(56) References Cited

U.S. PATENT DOCUMENTS

| 3,919,678 | A  | * | 11/1975 | Penfold ........................ 335/296 |
| 5,420,425 | A  | * | 5/1995  | Bier et al. ..................... 250/292 |
| 6,844,547 | B2 | * | 1/2005  | Syka ............................ 250/292 |
| 7,034,294 | B2 | * | 4/2006  | Schwartz et al. .............. 250/292 |
| 7,501,623 | B2 | * | 3/2009  | Tong et al. .................... 250/292 |
| 7,582,865 | B2 | * | 9/2009  | Schwartz et al. .............. 250/292 |
| 7,816,643 | B2 | * | 10/2010 | Hyodo .......................... 250/251 |
| 8,395,114 | B2 | * | 3/2013  | Fang et al. .................... 250/283 |
| 8,710,428 | B1 | * | 4/2014  | Loftus et al. .................. 250/251 |
| 2002/0117612 | A1 | * | 8/2002 | Kumagai et al. .............. 250/251 |
| 2003/0173524 | A1 | * | 9/2003 | Syka ........................... 250/396 R |
| 2005/0017170 | A1 | * | 1/2005 | Schwartz et al. .............. 250/292 |
| 2006/0232368 | A1 | * | 10/2006 | Gorshkov ..................... 335/306 |
| 2007/0029476 | A1 | * | 2/2007 | Senko et al. .................. 250/290 |
| 2007/0158550 | A1 | * | 7/2007 | Wells ........................... 250/292 |
| 2007/0176094 | A1 | * | 8/2007 | Wells ........................... 250/292 |

(Continued)

OTHER PUBLICATIONS

Tiecke, T.G., et. al., "High-flux two-dimensional magneto-optical-trap source for cold lithium atoms" Physical Review A 80, 013409 (2009).*

(Continued)

*Primary Examiner* — Nicole Ippolito
*Assistant Examiner* — Wyatt Stoffa
(74) *Attorney, Agent, or Firm* — Van Pelt, Yi & James LLP (57) ABSTRACT

The device for producing laser-cooled atoms comprises a two dimensional trap or a three-dimensional trap, or a combination of two- and three-dimensional traps. The two-dimensional trap comprises: three or more permanent magnets arranged around a perimeter of a loop, wherein a plane of the loop is perpendicular to a free axis of the two-dimensional atom trap, and the three or more permanent magnets bracket an internal volume of the two-dimensional atom trap; and one or more laser beam input ports enabling access for one or more laser beams to the internal volume of the two-dimensional atom trap.

34 Claims, 10 Drawing Sheets

(56) References Cited

U.S. PATENT DOCUMENTS

| | | | |
|---|---|---|---|
| 2007/0176096 A1* | 8/2007 | Wells | 250/292 |
| 2007/0176098 A1* | 8/2007 | Wells | 250/292 |
| 2008/0067361 A1* | 3/2008 | Senko et al. | 250/292 |
| 2008/0073494 A1* | 3/2008 | Hyodo | 250/251 |
| 2008/0156986 A1* | 7/2008 | Schwartz | 250/293 |
| 2008/0203294 A1* | 8/2008 | Senko | 250/292 |
| 2013/0048846 A1* | 2/2013 | Du et al. | 250/251 |

OTHER PUBLICATIONS

Dieckmann, K., et. al., "Two-dimensional magneto-optical trap as a source of slow atoms" Physical Review A 58, 3891 (1998).*

* cited by examiner

DEVICE FOR PRODUCING LASER-COOLED ATOMS

This invention was made with Government support under Contract #HR0011-09-C-0116 awarded by DARPA. The government has certain rights in the invention.

BACKGROUND OF THE INVENTION

Some scientific procedures utilize a cloud of atoms collected by an atom trap. A typical atom trap uses magnetic and/or optical fields and operates in one, two, or three dimensions. Some traps are conservative while others include dissipation. Conservative traps constrain the atoms to a particular volume without changing the sum of their kinetic and potential energy. Dissipative traps reduce the atoms' kinetic energy and may or may not constrain their position. Loading an atom trap from a thermal source of atoms can be inefficient, so a two-dimensional trap is often used to collect atoms into a beam, which is used to load one or more three-dimensional traps. Magneto-optical traps typically utilize electromagnets to produce the two and three-dimensional trapping fields due to the ease of shaping the field strength. Electromagnets are convenient for producing strong and configurable fields for this purpose. However, they require electrical power and typically require convective or conductive cooling, and thermal insulation, all of which can take up a great deal of space. Outgassing and thermal considerations favor housing electromagnets outside the vacuum chamber containing the trap, which is detrimental for applications in which it is critical to have a small device, since it tends to increase the distance from the electromagnets to the atom cloud and increase the overall size of the device. Magneto-optical traps that utilized permanent magnets in the past generated an approximation of the desired magnetic field with a pair of magnetic discs whose parallel faces contained a hole coincident with the geometric center of the discs. Additional corrective magnets have also been used to compensate field limitations. This is an inefficient arrangement as the field has nonlinearities that reduce the size of the trapping volume, and thus the loading rate, for a given magnet size and spacing. Other systems used flexible magnets rolled into a tube. The tube arrangement provides limited access to the trapping volume.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device for producing laser-cooled atoms is disclosed. The device for producing laser-cooled atoms comprises a two dimensional trap or a three-dimensional trap, or a combination of two- and three-dimensional traps. The two-dimensional trap comprises: three or more permanent magnets arranged around a perimeter of a loop, wherein a plane of the loop is perpendicular to a free axis of the two-dimensional atom trap, and the three or more permanent magnets bracket an internal volume of the two-dimensional atom trap; and one or more laser beam input ports enabling access for one or more laser beams to the internal volume of the two-dimensional atom trap.

In some embodiments. the three-dimensional atom trap comprises: a first set of permanent magnets positioned along a first perimeter of a first loop; a second set of permanent magnets positioned along a second perimeter of a second loop, wherein the first loop and the second loop bracket an internal volume of the three-dimensional atom trap; and one or more laser beam input ports enabling one or more laser beams to access the internal volume of the three-dimensional atom trap.

In some embodiments, the first loop and the second loop are parallel and coaxial and offset to bracket the three-dimensional atom trap. In some embodiments, the atom trap comprises a two-dimensional and one or more three-dimensional atom traps, wherein the free axis of the two-dimensional atom trap intersects the three-dimensional atom traps. In some embodiments, the atom trap comprises a two-dimensional atom trap and two three-dimensional atom traps, wherein the free axis of the two-dimensional atom trap intersects the three-dimensional atom traps that are positioned at opposite ends of the two-dimensional atom trap. In some embodiments, a laser beam input port comprises a path for a laser beam that includes one or more of the following: a mirror, a beam splitter, a fiber, a window, or any other appropriate element or space that enables the propagation of a laser beam.

In some embodiments, an atom vapor source is coupled to a two-dimensional magneto-optical trap, such that the combination produces an atom beam exiting the trap from each end. A two-dimensional magneto-optical trap is formed using a novel arrangement of permanent magnets that produce a large trapping volume with linear fields inside the trapping volume and small fringing fields outside the trapping volume. In some embodiments, one end of the two-dimensional trap is coupled to a three-dimensional magneto-optical trap. In some embodiments, both ends of the two-dimensional trap are coupled to a three-dimensional magneto-optical trap. The small fringing fields of the novel magnet design of the two-dimensional trap allow three-dimensional traps to be placed very close to the ends of the two-dimensional trap, an order of magnitude closer than achieved in previous designs. Placing the two-dimensional and three-dimensional traps close together relaxes the collimation requirements for the beam traveling from the two-dimensional trap, thus allowing the two dimensional trap to be shorter. The three-dimensional traps are also formed using a novel arrangement of permanent magnets that is similar to the two-dimensional trap magnet arrangement with further adaptation to capture atoms in all three dimensions. The novel arrangement of magnets yields a magnetic field close to the ideal field arrangement for a three-dimensional trap, maximizing the trapping volume and the loading rate of atoms into the trap.

Figure 1:
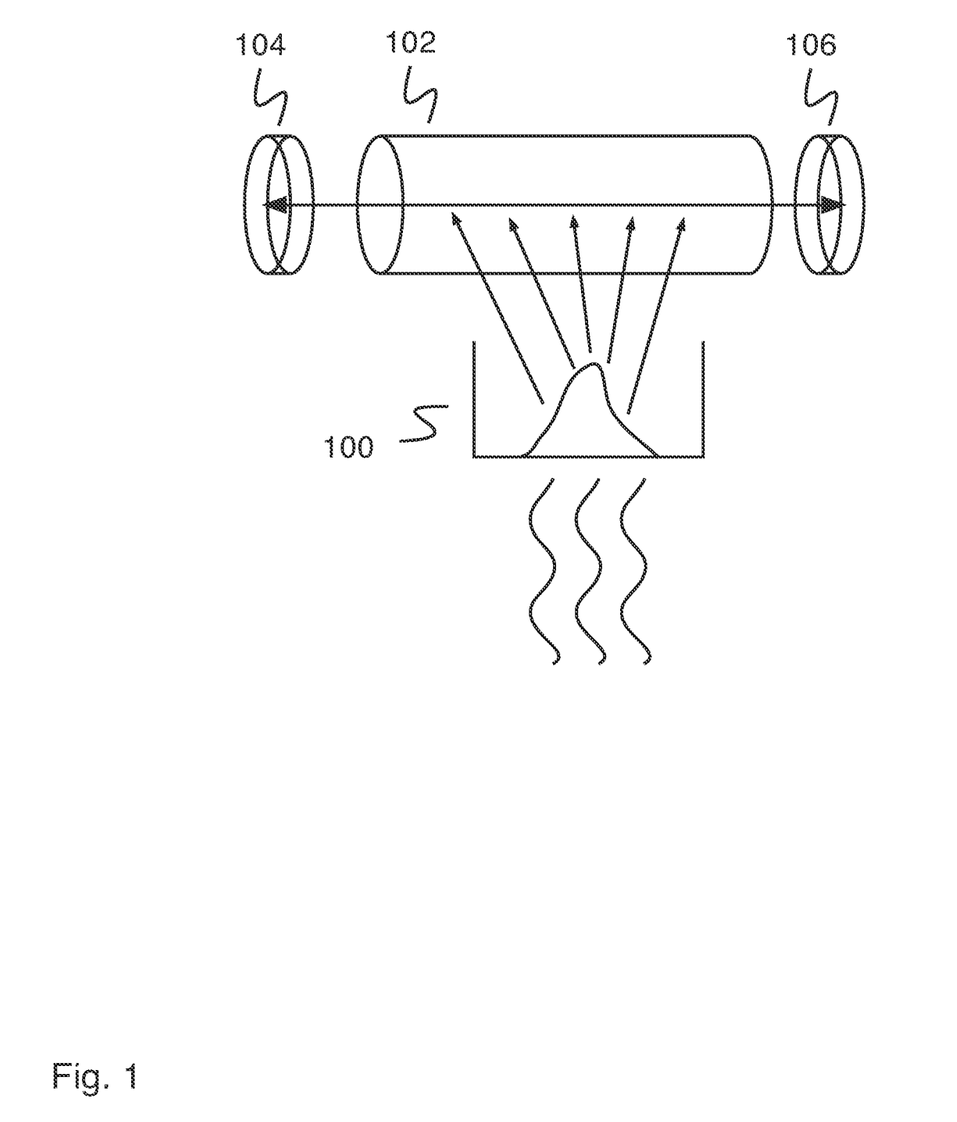
FIG. 1 is a diagram illustrating an embodiment of a device for producing laser-cooled atoms.

FIG. 1 is a diagram illustrating an embodiment of a device for producing laser-cooled atoms. In the example shown, the device for producing laser-cooled atoms comprises atom source 100. In various embodiments, atom source 100 comprises an atom evaporator, a gaseous atom source, a vapor pressure atom source, a laser-ablation-based atom source, an electron beam atom source, a plasma-based atom source, a discharge-based atom source, a cold finger, a getter-based dispenser, or any other appropriate atom source. Atom source 100 is coupled to two-dimensional atom trap 102, e.g., through an atom source input port. Two-dimensional atom trap 102 traps atoms in two dimensions, e.g., in the vertical and into/out of the page axes as drawn in FIG. 1. Two-dimensional atom trap 102 comprises a free axis, wherein the atoms are allowed to move freely along the free axis, e.g., in the horizontal axis as drawn in FIG. 1. Atoms entering two-dimensional atom trap 102 lose their momentum along the trap axes and are drawn to the center of the trap, but retain their momentum in the free axis, producing an atomic beam exiting the two-dimensional atom trap 102 at its two ends on the free axis, e.g., on the left and right sides as drawn in FIG. 1. The longer atoms spend in two-dimensional atom trap 102, the closer they get to the trapping center on average and the more their momentum in the trapping dimensions is reduced, thus the longer the trap is along the free axis (e.g., the longer it takes the atoms to reach the end) the better collimated the exiting atomic beam. Conversely, the shorter the two-dimensional atom trap the poorer the collimation of the exiting beam. Designing two-dimensional atom trap 102 such that the magnitude and gradient of the magnetic field near the ends is suppressed by two orders of magnitude within a short distance (e.g. 1 cm) of the trap ends enables placement of three-dimensional atom traps close by (e.g., within less than two centimeters as opposed to within tens of centimeters with other typical designs). Being able to place the three-dimensional atom trap in such close proximity to the two-dimensional atom trap allows for shorter two-dimensional atom trap lengths—for example, 2.5 centimeters long compared with typical lengths of 15 centimeters. The exiting atomic beams enter three-dimensional atom trap 104, positioned at a first end of the two-dimensional atom trap 102, and three-dimensional atom trap 106, positioned at a second end of two-dimensional atom trap 102. Three-dimensional atom trap 104 and three-dimensional atom trap 106 each comprise an internal volume, i.e., a volume in which entering atoms are captured. The free axis of two-dimensional atom trap 102 intersects the internal volume of three-dimensional atom trap 104 and the internal volume of three-dimensional atom trap 106 at opposite ends of two-dimensional atom trap 102. The system of atom source 100 to feed two-dimensional atom trap 102 to feed three-dimensional atom trap 104 and/or three-dimensional atom trap 106 is designed with the goal of achieving a high flux of atoms into three-dimensional atom trap 104 and/or three-dimensional atom trap 106. In some embodiments, the flux of atoms from two-dimensional atom trap 102 is regulated. In various embodiments, the flux of atoms from two-dimensional atom trap 102 is regulated by adjusting the temperature of source 100, other parameters of source 100, the alignment of optical fields, the amplitude of optical fields, the alignment of magnetic fields, the amplitude of magnetic fields, or any other appropriate atom trap adjustments. In various embodiments, the regulation uses monitors or servos that sense the population, spatial distribution, kinetic energy of the three-dimensional atom traps and/or the laser fields (power, polarization, spatial distribution) and/or magnetic fields, or any other appropriate adjustment device.

Figure 2:
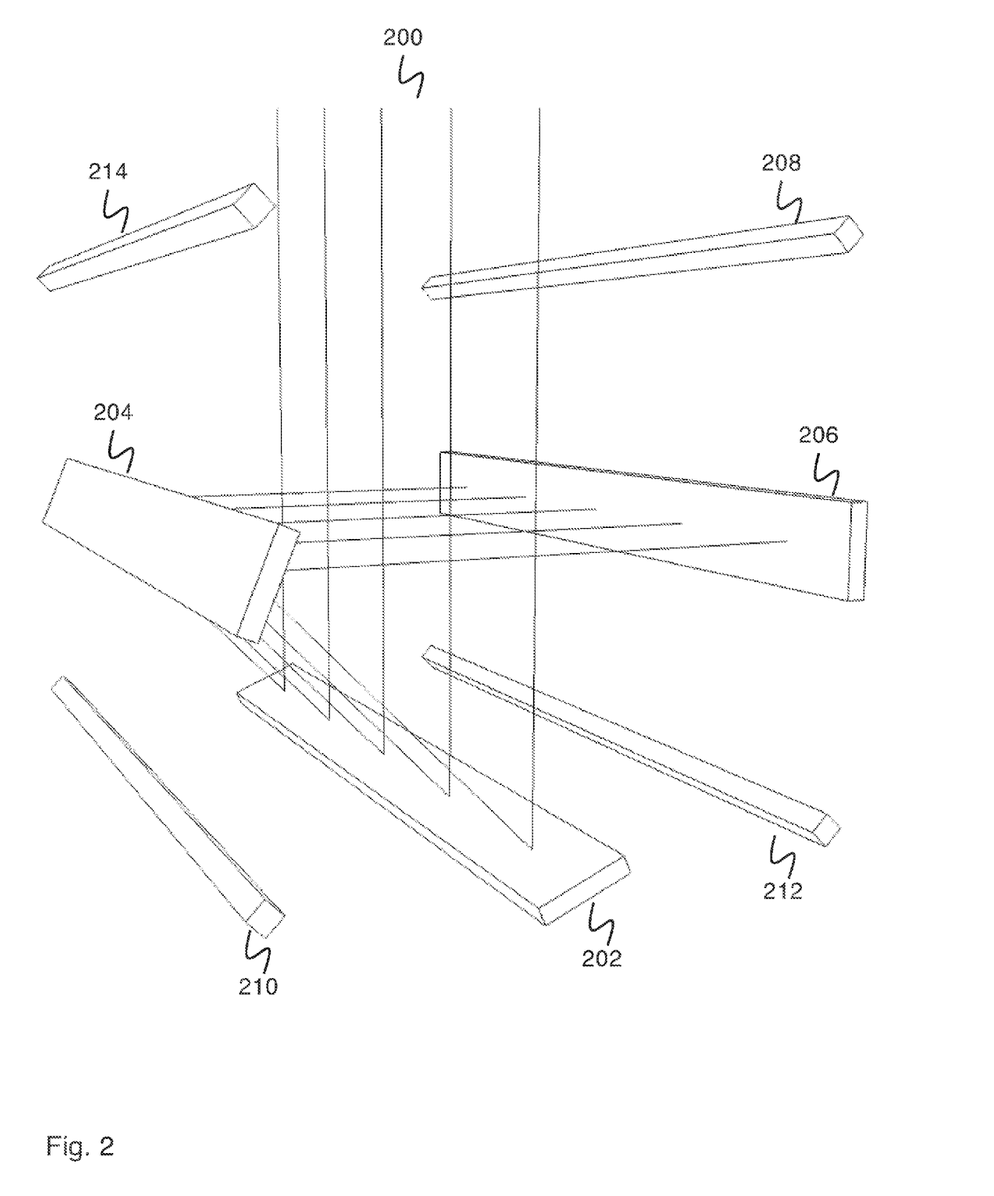
FIG. 2 is a diagram illustrating an embodiment of a two-dimensional atom trap.

FIG. 2 is a diagram illustrating an embodiment of a two-dimensional atom trap. In some embodiments, the two-dimensional atomic trap of FIG. 2 is used to implement the two-dimensional atomic trap 102 of FIG. 1. In the example shown, two-dimensional atom trap of FIG. 2 comprises four magnets (e.g., permanent bar magnets) arranged around the perimeter of a loop, wherein the plane of the loop is perpendicular to the free axis of the trap and the magnets bracket the internal volume of the trap. The two-dimensional atom trap additionally comprises a laser beam entering the two-dimensional atom trap through a laser beam input port and guided by three mirrors to intersect the free axis in two axes. In some embodiments, the two-dimensional atom trap uses three or more permanent magnets arranged around the perimeter of a loop. In some embodiments, the magnets are segmented. In some embodiments, the magnets are arranged with gaps between the segments. In some embodiments, the magnets are arranged without gaps between the segments. In some embodiments, the long axis of the magnets is parallel to the free axis of the trap. Configurations that use 4N magnets (N=1, 2, 3, . . . ) placed at positions equidistant from the free axis of the two-dimensional atom trap and at equal angular intervals about the free axis of the atom trap produce cylindrically symmetric magnetic fields. In this case, the magnetic field along any given trap axis has a single non-zero component in the internal volume of the trap. In some embodiments, the two-dimensional atom trap uses one or more additional nulling permanent magnets to null the magnetic field produced by the two-dimensional trap in volumes adjacent to the trap.

Laser beam 200 comprises a laser beam entering the two-dimensional atom trap through an input port. Laser beam 200 is drawn as five individual lines in FIG. 2. In some embodiments, laser beam 200 comprises a single laser beam spread in one dimension to intersect the length of the free axis of a two-dimensional atom trap. Laser beam 200 is reflected by mirror 202, mirror 204, and mirror 206, guiding it to intersect the length of the free axis along two axes. In some embodiments, the two axes are orthogonal. In some embodiments, the two axes are substantially orthogonal. In some embodiments, mirror 202, mirror 204, and mirror 206 are arranged in a racetrack geometry. Mirror 202 and mirror 204 are positioned at 22.5 degree angle relative to laser beam 200 as it is incident upon each of them, each reflecting it over a total 45 degree included angle. Mirror 206 is positioned orthogonal to laser beam 200, reflecting it back upon its original path. Laser light thus intersects the free axis of the two-dimensional atom trap from four directions. In some embodiments, mirror 202, mirror 204, and mirror 206 comprise an optical racetrack guiding a laser beam input via a single laser beam input port to traverse the volume of the three-dimensional atom trap from four directions. The free axis of the two-dimensional atom trap lies along a line passing through the intersection of orthogonal beams of laser beam 200. Previous optical racetracks for two-dimensional traps used four mirrors and one waveplate to direct the beams and set the optical polarization. In this case, the single waveplate is placed in front of the mirror that causes the optical beam to reflect back upon its original path. The remaining polarization flips necessary for trap operation occur as a result of the mirror reflections. In contrast, the racetrack of FIG. 2 uses three mirrors and two waveplates. This configuration of the racetrack occupies less volume for a given set of optical beam. Mirror 202 has a λ/4 waveplate in front of the reflecting surface to change the polarization of an incident beam. Mirror 206 has a λ/4 waveplate in front of the reflecting surface to change the polarization of the incident beam. Both waveplates are double-passed, so overall they act as λ/2 waveplates. The waveplate in front of mirror 202 is used at non-normal incidence. In this case, the retardation for the waveplate depends on the angle between the light field k-vector and the waveplate's optic axis: rotating the k-vector parallel to the waveplate's optic axis increases the single-pass retardation while rotating the k-vector perpendicular to the waveplate's optic axis decreases the retardation. As a result, the single-pass retardation for the waveplate in front of mirror 202 is equal to λ/4 for a discrete set of angles $\theta=N(\pi/4)$ where $N=1, 3, 5, \ldots$ where θ denotes rotation about the symmetry axis normal to the waveplate surface. In some embodiments, the optical racetrack comprises an odd number of mirrors and an even number of λ/4 waveplates. In some embodiments, one or more of the even number of λ/4 waveplates is used at substantially non-normal incidence. In some embodiments, an angle of incidence is approximately 22.5 degrees for the one or more of the even number of λ/4 waveplates. In some embodiments, a laser beam spread in one dimension enters the two dimensional atom trap via a laser beam port and traverses the free axis of the two dimensional atom trap is reflected using a first mirror over a 45 degree angle and phase shifted using a λ/4 waveplate and then reflected again using a second mirror to traverse the free axis orthogonal to the original traverse. After the second traverse, the laser beam is reflected back on itself using a third mirror and a λ/4 waveplate to traverse back across the free axis. The laser beam is then reflected again using the second mirror and then again by the first mirror and the λ/4 waveplate again to traverse the free axis in the opposite direction from the initial traverse.

The two-dimensional atom trap of FIG. 2 additionally comprises magnet 208, magnet 210, magnet 212, and magnet 214. The four magnets extend parallel to the free axis and are arranged on the corners of a square with the plane of the square normal to the free axis of the trap. In some embodiments, the magnetization of each of the four permanent magnets points 90 degrees from the free axis and the two magnets on each side of the square have bilaterally symmetric magnetization relative to the center of the side. In some embodiments, the magnetization of each of the four magnets is orthogonal to the free axis and tilted 45 degrees from a side of the square. In the example shown, the magnets each have a square cross-section and the magnetization points orthogonally from a side of the square cross-section. In some embodiments, the magnets have a rectangular cross-section. In some embodiments, the magnetization of each magnet is pointing 90 degrees from the direction to the free axis (e.g., the magnetization of magnet 214 is pointed to the upper right or to the lower left, but not directly toward or away from the free axis). In some embodiments, the two magnets on each side of the square have bilaterally symmetric magnetization relative to the center of the side (e.g., the magnetization of magnet 214 and magnet 208 are either both pointed up and in to the top side of the square or down and out from the top side of the square).

In some embodiments, the magnetization of the four permanent magnets has bilateral symmetry along the two orthogonal axes of the square. Bilateral symmetry along an axis comprises mirror image symmetry centered on the axis. Bilateral symmetry of magnetization along the two orthogonal axes of the square indicates mirror image symmetry of magnetization centered on the vertical axis crossing the free axis and also mirror image symmetry of magnetization centered on the horizontal axis crossing the free axis (e.g., magnet 214 has vertically opposite magnetization from magnet 210 and horizontally opposite magnetization from magnet 208).

In some embodiments, magnet 208, magnet 210, magnet 212, and magnet 214 and mirror 202, mirror 204, and mirror 206 are all contained within a vacuum chamber. In some embodiments, magnet 208, magnet 210, magnet 212, and magnet 214 and mirror 202, mirror 204, and mirror 206 are all contained within a magnetic shield. In some embodiments, the magnetic shield comprises one or more layers of one or more materials surrounding the permanent magnets. In various embodiments, the magnetic shield comprises a material with high magnetic permeability, multiple layers—a mix of high permeability material (e.g., mu metal) with a lower permeability (e.g., soft iron), one or more layers of one or more materials, a magnetically permeable nano-technology coating, magnetically soft ferrites, or any other appropriate shield. In various embodiments, the individual magnets are segmented into several axial pieces that are pressed together or separated. In various embodiments, magnet 208, magnet 210, magnet 212, or magnet 214 is made from Alnico, samarium cobalt, ferrite ceramics, neodymium iron boron, or flexible sheets or strips, or any other appropriate material. In various embodiments, the magnets are pressed, molded, bonded, or sintered, or any other appropriate process. In various embodiments, the magnets are ground to shape before or after orienting their magnetization. In some embodiments, magnet 208, magnet 210, magnet 212, and magnet 214 comprise domains written into re-writable magnetic media.

Figure 3A:
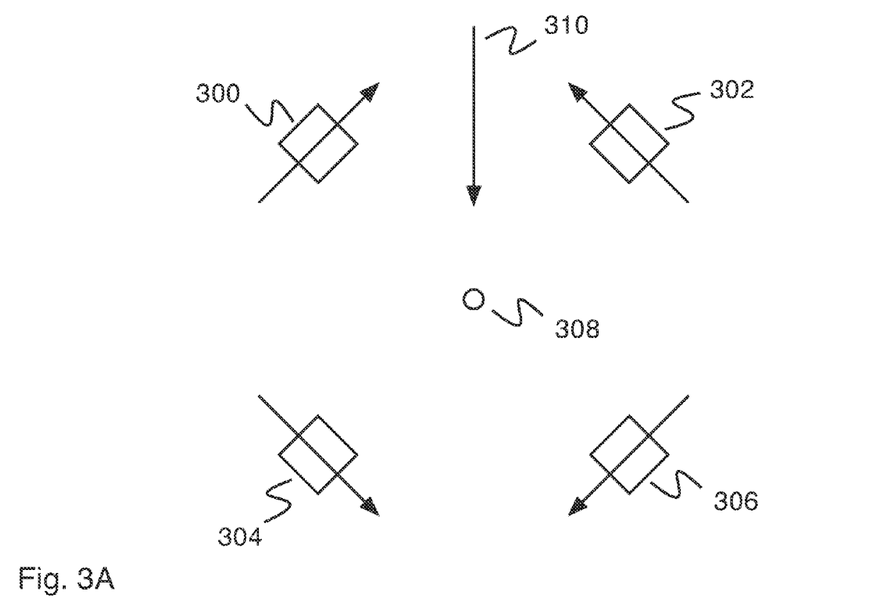
FIG. 3A is a diagram illustrating the magnetization of an embodiment of a two-dimensional atom trap using four permanent magnets.

FIG. 3A is a diagram illustrating the magnetization of an embodiment of a two-dimensional atom trap using four permanent magnets. In some embodiments, the two-dimensional atom trap is used to implement the two-dimensional atom trap of FIG. 2. In the example shown, magnet 300, magnet 302, magnet 304 and magnet 306 are each a permanent magnet that are part of a two-dimensional atom trap. Circle 308 indicates the free axis of the two-dimensional atom trap. Arrow 310 indicates a laser beam entering the two-dimensional atom trap. Magnet 300, magnet 302, magnet 304, magnet 306, and the free axis extend into and out of the page. In the example shown, the magnetization of magnet 300 is up and to the right. The magnetization of magnet 302 is up and to the left. The magnetization of magnet 304 is down and to the right. The magnetization of magnet 306 is down and to the left. The magnetization of each of the four permanent magnets is orthogonal to the free axis and tilted 45 degrees from a side of the square. The magnetization of each of the four permanent magnets is pointing 90 degrees from the direction to the free axis, and the two magnets on each side of the square have bilaterally symmetric magnetization relative to the center of the side.

Figure 3B:
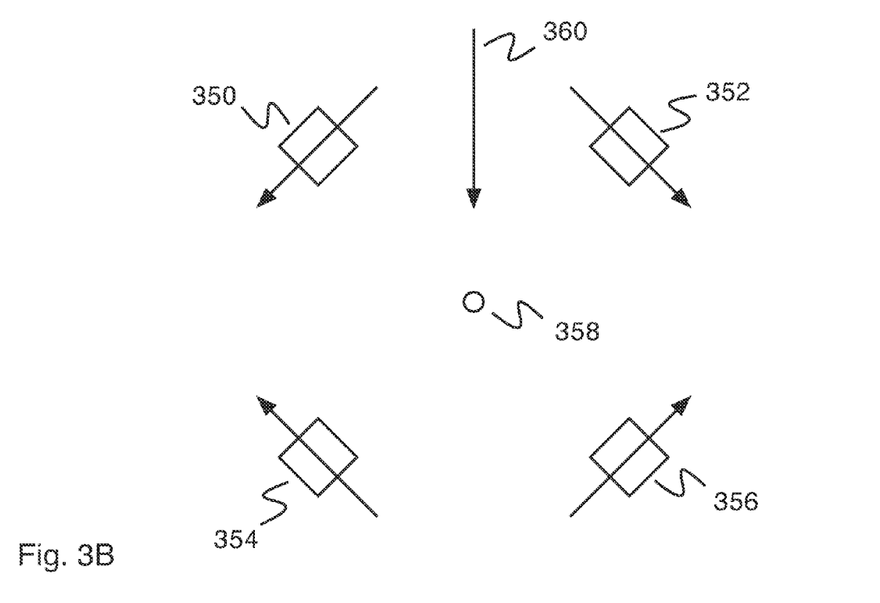
FIG. 3B is a diagram illustrating the magnetization of an embodiment of a two-dimensional atom trap using four permanent magnets.

FIG. 3B is a diagram illustrating the magnetization of an embodiment of a two-dimensional atom trap using four permanent magnets. In some embodiments, the two-dimensional atom trap is used to implement the two dimensional atom trap of FIG. 2. In the example shown, magnet 350, magnet 352, magnet 354 and magnet 356 are each a permanent magnet that are part of a two-dimensional atom trap. Circle 358 indicates the free axis of the two-dimensional atom trap. Arrow 360 indicates a laser beam entering the two-dimensional atom trap. Magnet 350, magnet 352, magnet 354, magnet 356, and the free axis extend into and out of the page. In the example shown, the magnetization of magnet 350 is down and to the left. The magnetization of magnet 352 is down and to the right. The magnetization of magnet 354 is up and to the left. The magnetization of magnet 356 is up and to the right. The magnetization of each of the four permanent magnets is orthogonal to the free axis and tilted 45 degrees from a side of the square. The magnetization of each of the four permanent magnets is pointing 90 degrees from the direction to the free axis, and the two magnets on each side of the square have bilaterally symmetric magnetization relative to the center of the side. In some embodiments, the two-dimensional atom trap shown in FIG. 3B comprises the two-dimensional atom trap shown in FIG. 3B rotated 90 degrees either clockwise or counterclockwise about the free axis.

Figure 4:
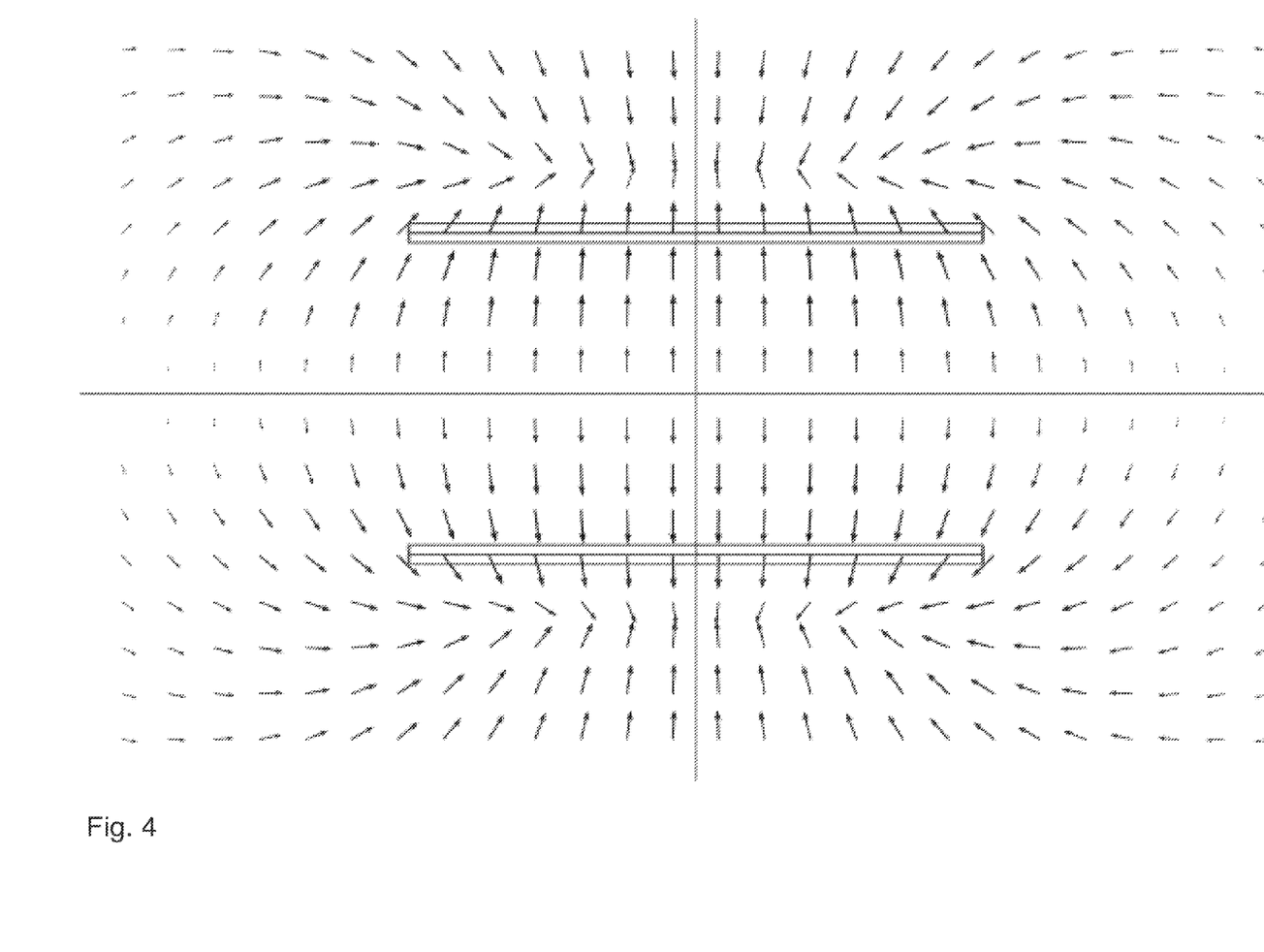
FIG. 4 is a diagram illustrating the magnetic field through a cross-section of an embodiment of a two-dimensional atom trap.

FIG. 4 is a diagram illustrating the magnetic field through a cross-section of an embodiment of a two-dimensional atom trap. In some embodiments, the two-dimensional atom trap is used to implement the two-dimensional atom trap of FIG. 2. In the example shown, the cross-section of the two-dimensional atom trap is taken on a plane containing the free axis of the trap and the symmetry axis between any two of the four magnets comprising the trap. The field strength along the free axis is zero everywhere and changes approximately linearly from the first magnet shown to the second magnet shown with a zero point at the center (e.g., the trap slows and pushes atoms toward the center where the net force on the atoms approaches zero).

Figure 5:
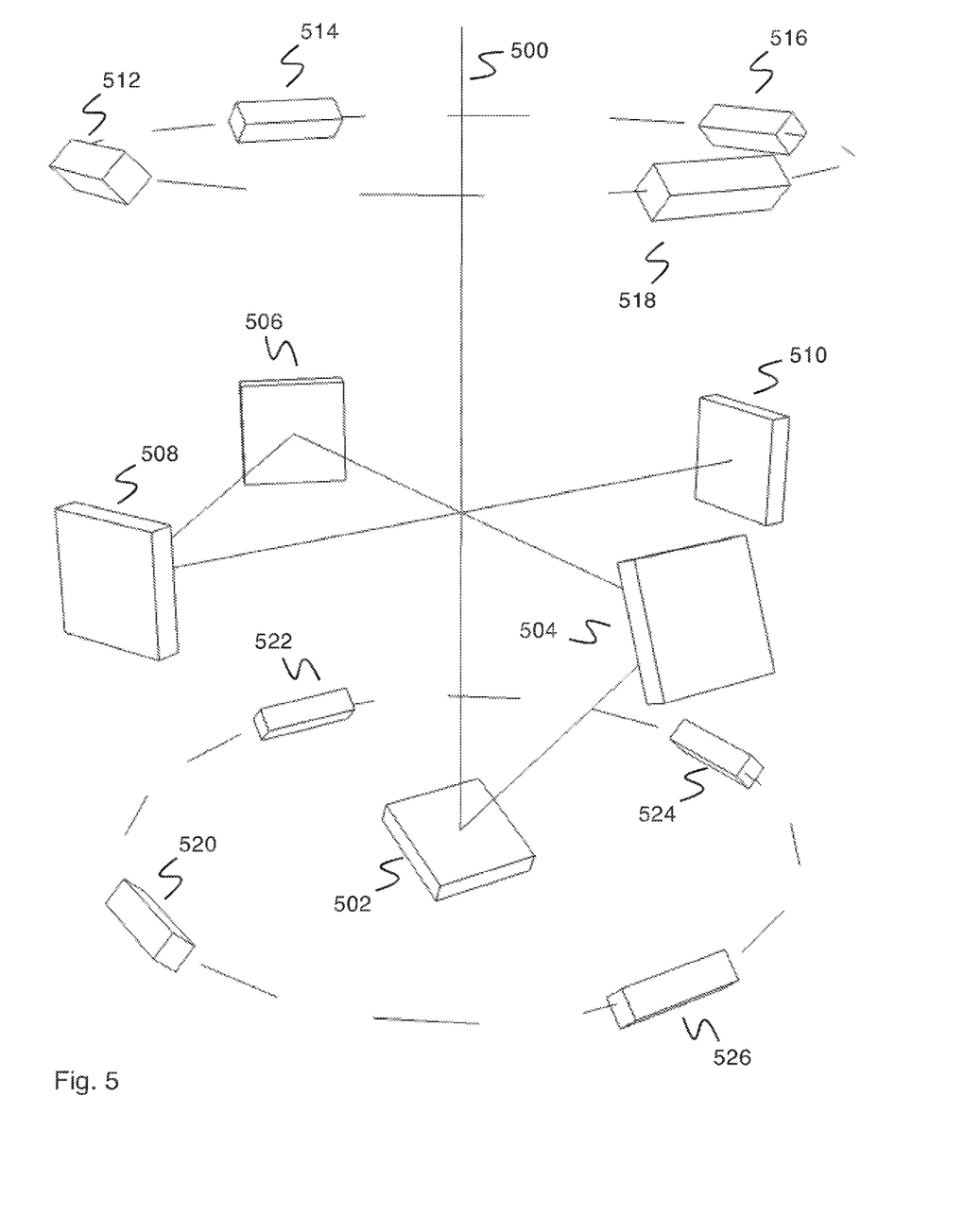
FIG. 5 is a diagram illustrating an embodiment of a three-dimensional atom trap.

FIG. 5 is a diagram illustrating an embodiment of a three-dimensional atom trap. In some embodiments, the three-dimensional atom trap of FIG. 3 is used to implement three-dimensional atom trap 104 of FIG. 1 or three-dimensional atom trap 106 of FIG. 1. In the example shown, the three-dimensional atom trap of FIG. 5 comprises eight magnets and a laser beam entering the three-dimensional atom trap through a laser beam input port. In some embodiments, an optical racetrack guides a laser beam input via a laser beam input port to traverse the volume of the three dimensional atom trap from three or more directions. In some embodiments, an optical racetrack guides a laser beam input via a laser beam input port to traverse the volume of the three dimensional atom trap from six directions. In some embodiments, the racetrack comprises five mirrors. In some embodiments, the laser beam is guided by five mirrors to intersect along three orthogonal axes at the geometric center of the two magnet arrays. Laser beam 500 comprises a laser beam entering the three-dimensional atom trap through an input port. Laser beam 500 is reflected by mirror 502, mirror 504, mirror 506, mirror 508, and mirror 510, guiding it to intersect from three orthogonal directions. In some embodiments, mirror 502, mirror 504, mirror 506, mirror 508, and mirror 510 comprise a racetrack. Mirror 502, mirror 504, mirror 506, and mirror 508 are positioned at a 22.5 degree angle relative to laser beam 500 as it is incident upon them, each reflecting it over a total 45 degree included angle. Mirror 510 is positioned orthogonal to laser beam 500, reflecting it back upon its original path. Laser light thus intersects the center of the three-dimensional atom trap from all six orthogonal directions. The center of the three-dimensional atom trap is substantially coincident with the point where laser beam 500 crosses itself in three axes. This point is coincident with the geometric center of the two magnet arrays. Previous optical racetracks for three-dimensional traps used six mirrors and one waveplate to direct the beams and set the optical polarization. In this case, the single waveplate is placed in front of the mirror that causes the optical beam to reflect back upon its original path. The remaining polarization flips that are necessary for trap operation occur as a result of the mirror reflections. In contrast, the racetrack of FIG. 5 uses five mirrors and two waveplates. This racetrack configuration occupies less volume for a given set of optical beam dimensions. Mirror 502 and mirror 510 each have a $\lambda/4$ waveplate in front of the reflecting surface to change the polarization of laser beam 500. Both waveplates are double-passed, so overall they each act as $\lambda/2$ waveplates. The waveplate in front of mirror 502 is used at non-normal incidence. In this case, the retardation for the waveplate depends on the angle between the light field k-vector and the waveplate's optic axis: rotating the k-vector parallel to the waveplate's optic axis increases the single-pass retardation while rotating the k-vector perpendicular to the waveplate's optic axis decreases the retardation. As a result, the single-pass retardation for the waveplate in front of mirror 502 is only equal to $\lambda/4$ for a discrete set of angles $\theta=N(\pi/4)$ where N=1, 3, 5, . . . where $\theta$ denotes rotation about the symmetry axis normal to the waveplate surface. In some embodiments, the optical racetrack comprises an odd number of mirrors and an even number of $\lambda/4$ waveplates. In some embodiments, one or more of the even number of $\lambda/4$ waveplates is used at substantially non-normal incidence. In some embodiments, an angle of incidence is approximately 22.5 degrees for the one or more of the even number of $\lambda/4$ waveplates. In some embodiments, a laser beam enters the three dimensional atom trap via a laser beam port and traverses the center of the three dimensional atom trap is reflected using a first mirror over a 45 degree angle and phase shifted using a $\lambda/4$ waveplate and then reflected again using a second mirror to traverse the center orthogonal to the original traverse. After the second traverse, the laser beam is reflected using a third mirror over a 45 degree angle and reflected again using a fourth mirror to traverse the center orthogonal to the first two traverses. The laser beam is the reflected back on itself using a fifth mirror and a λ/4 waveplate to traverse back across the center. The laser beam is then reflected again using the fourth mirror and the third mirror to traverse the center and then again by the second mirror and the first mirror and the λ/4 waveplate again to traverse the center in the opposite direction from the initial traverse. In some embodiments, the three-dimensional atom trap uses one or more additional nulling permanent magnets to null the magnetic field produced by the three-dimensional trap in volumes adjacent to the trap.

The three-dimensional atom trap of FIG. 5 additionally comprises magnet 512, magnet 514, magnet 516, magnet 518, magnet 520, magnet 522, magnet 524, and magnet 526. Magnet 512, magnet 514, magnet 516, and magnet 518 comprise a first set of magnets and magnet 520, magnet 522, magnet 524, and magnet 526 comprise a second set of magnets. In some embodiments, the first set of magnets is positioned around a first perimeter of a first loop. In some embodiments, the second set of magnets is positioned around a second perimeter of a second loop. The first loop and the second loop bracket the internal volume of the three-dimensional atom trap. In some embodiments, the first loop and the second loop are substantially parallel. In some embodiments, the first loop and the second loop are substantially coaxial. In some embodiments, the three dimensional atom trap comprises one or more laser beam input ports. In some embodiments, the magnets making up the first set of magnets are symmetrically placed around the first perimeter. In some embodiments, each magnet of the first set of permanent magnets has a magnetization perpendicular to the first perimeter and tilted 45 degrees away from the plane containing the first perimeter. In some embodiments, magnets making up the second set of magnets are symmetrically placed around the second perimeter. In some embodiments, each magnet of the second set of permanent magnets has a magnetization perpendicular to the second perimeter and tilted 45 degrees away from the plane containing the second perimeter. In the example shown, the first set of permanent magnets comprises four magnets. In various embodiments, the first set of permanent magnets comprises two, three, five, twelve, or any other appropriate number of magnets. In the example shown, the second set of permanent magnets comprises four magnets. In various embodiments, the second set of permanent magnets comprises two, three, five, twelve, or any other appropriate number of magnets.

In some embodiments, one orthogonal direction is perpendicular to the first loop and the second loop. In some embodiments, the one orthogonal direction is an axis along which a first center of the first loop and a second center of the second loop are offset by a distance. In some embodiments, each magnet of the first set of permanent magnets has a magnetization perpendicular to the first perimeter and tilted 45 degrees away from the plane of the first loop, away from the internal volume and toward the axis. In some embodiments, each magnet of the first set of permanent magnets has a magnetization perpendicular to the first perimeter and tilted 45 degrees away from the plane of the first loop, toward the internal volume and away from the axis. In some embodiments, each magnet of the second set of permanent magnets has a magnetization perpendicular to the second perimeter and tilted 45 degrees away from the plane of the second loop, away from the internal volume and toward the axis. In some embodiments, each magnet of the second set of permanent magnets has a magnetization perpendicular to the second perimeter and tilted 45 degrees away from the plane of the second loop, toward the internal volume and away from the axis. In some embodiments, the three-dimensional atom trap comprises a magnetic shield comprising one or more layers of one or more materials that surrounds the permanent magnets. In some embodiments, magnet 512, magnet 514, magnet 516, magnet 518, magnet 520, magnet 522, magnet 524, and magnet 526 comprise domains written into re-writable magnetic media.

Figure 6A:
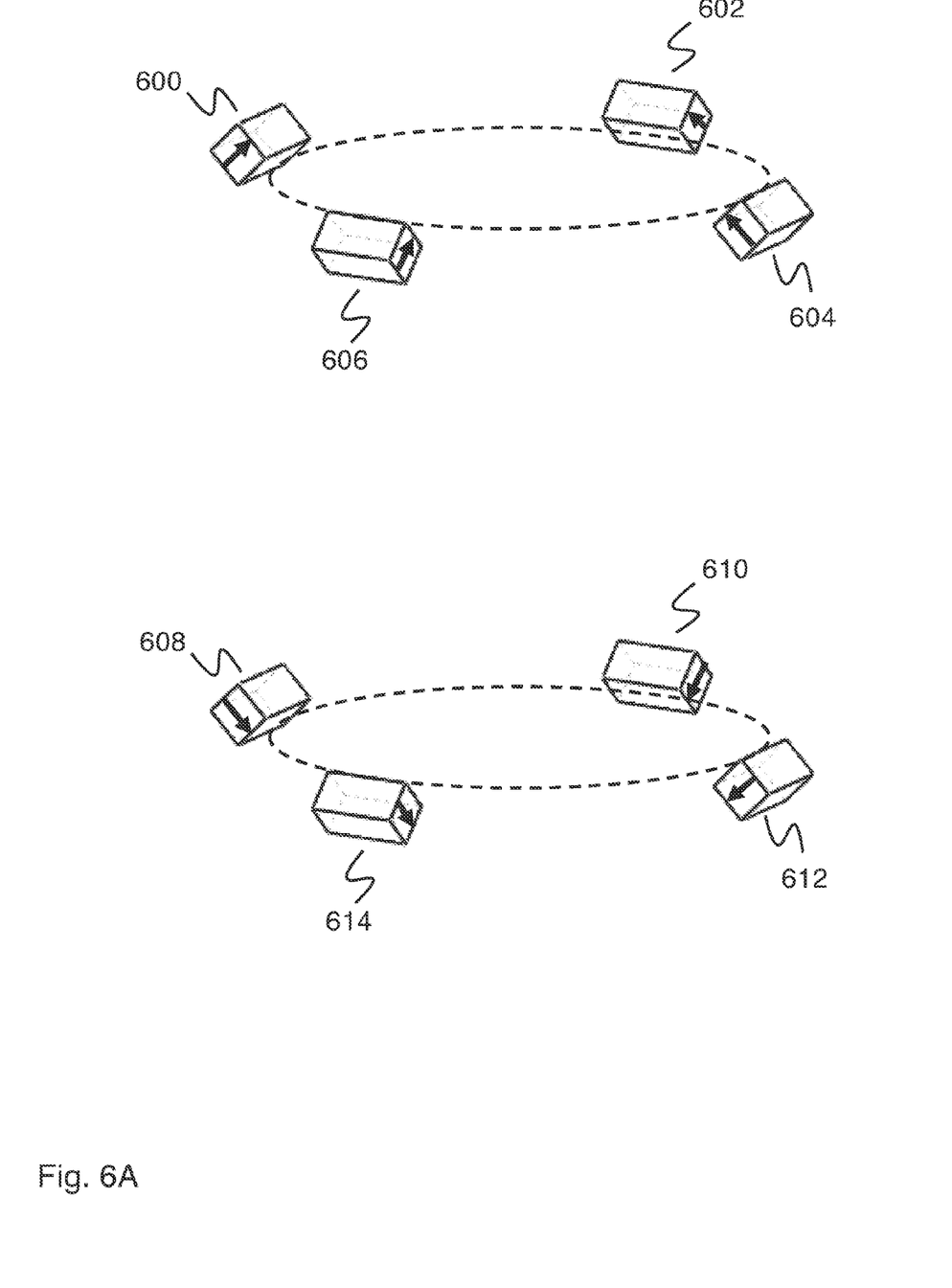
FIG. 6A is a diagram illustrating an embodiment of the magnetization of a three-dimensional atom trap using eight permanent magnets.

FIG. 6A is a diagram illustrating an embodiment of the magnetization of a three-dimensional atom trap using eight permanent magnets. In some embodiments, the three-dimensional atom trap comprises the three-dimensional atom trap of FIG. 5. In the example shown, magnet 600, magnet 602, magnet 604, magnet 606, magnet 608, magnet 610, magnet 612, and magnet 614 comprise permanent magnets forming a three-dimensional atom trap. Magnet 600, magnet 602, magnet 604, and magnet 606 are arranged on the perimeter of a first loop and magnet 608, magnet 610, magnet 612, and magnet 614 are arranged on the perimeter of a second loop. One orthogonal direction is perpendicular to the first loop and the second loop, along which a first center of the first loop and a second center of the second loop are offset by a distance. The center of the atom trap lies on the orthogonal direction at the midpoint between the center of the first loop and the center of the second loop. Magnet 600, magnet 602, magnet 604, magnet 606 each have a magnetization perpendicular to the first perimeter and tilted away from the plane of the first loop, away from the internal volume and toward the axis. Magnet 608, magnet 610, magnet 612, magnet 614 each have a magnetization perpendicular to the second perimeter and tilted away from the plane of the second loop, away from the internal volume and toward the axis.

Figure 6B:
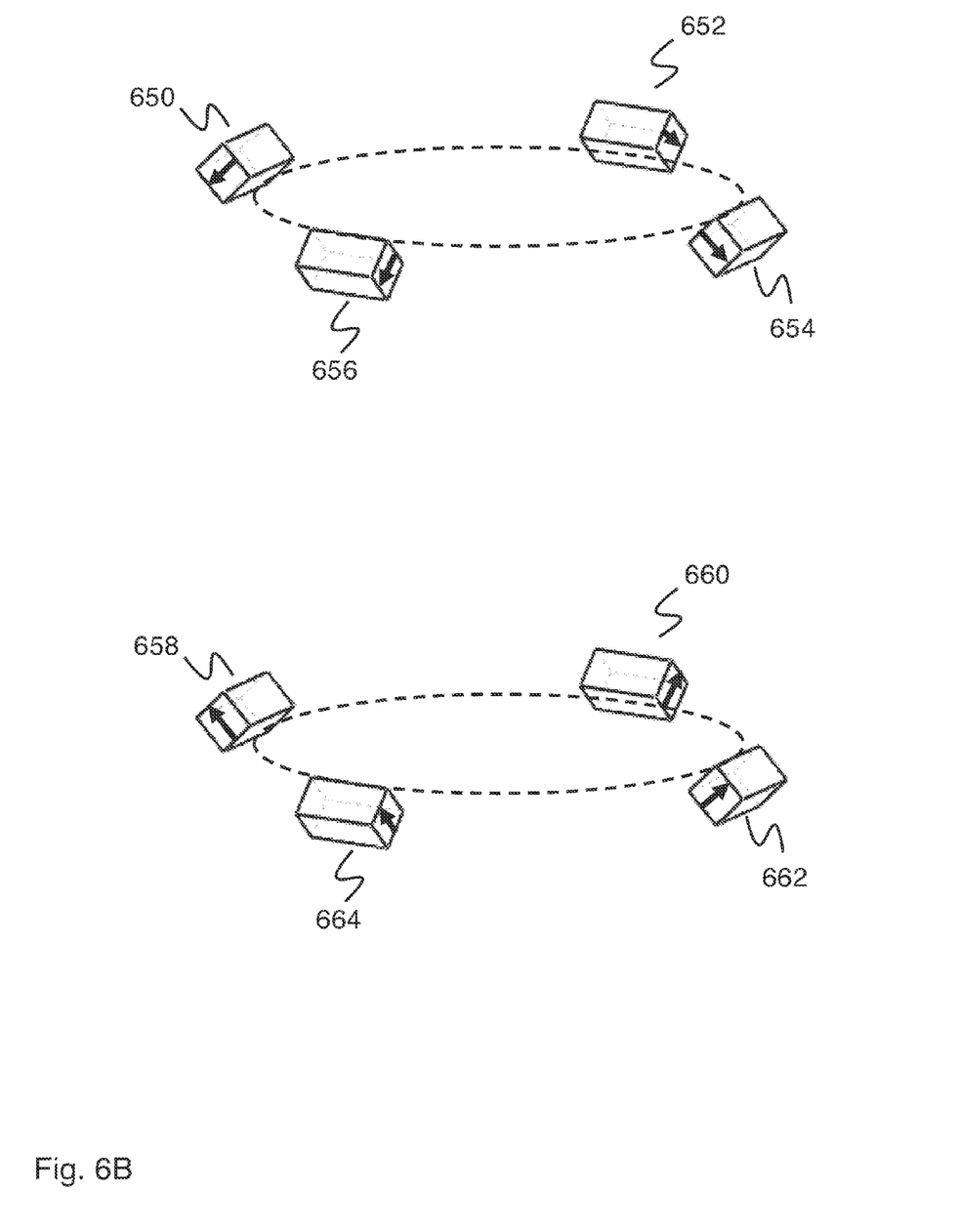
FIG. 6B is a diagram illustrating the magnetization of an embodiment of a three-dimensional atom trap using eight permanent magnets.

FIG. 6B is a diagram illustrating the magnetization of an embodiment of a three-dimensional atom trap using eight permanent magnets. In some embodiments, the three-dimensional atom trap comprises the three-dimensional atom trap of FIG. 5. In the example shown, magnet 650, magnet 652, magnet 654, magnet 656, magnet 658, magnet 660, magnet 662, and magnet 664 comprise permanent magnets forming a three-dimensional atom trap. Magnet 650, magnet 652, magnet 654, and magnet 656 are arranged on the perimeter of a first loop and magnet 658, magnet 660, magnet 662, and magnet 664 are arranged on the perimeter of a second loop. One orthogonal direction is perpendicular to the first loop and the second loop, along which a first center of the first loop and a second center of the second loop are offset by a distance. The center of the atom trap lies on the orthogonal direction at the midpoint between the center of the first loop and the center of the second loop. Magnet 650, magnet 652, magnet 654, magnet 656 each have a magnetization perpendicular to the first perimeter and tilted away from the plane of the first loop, toward the internal volume and away from the axis. Magnet 658, magnet 660, magnet 662, magnet 664 each have a magnetization perpendicular to the second perimeter and tilted away from the plane of the second loop, toward the internal volume and away from the axis.

Figure 7:
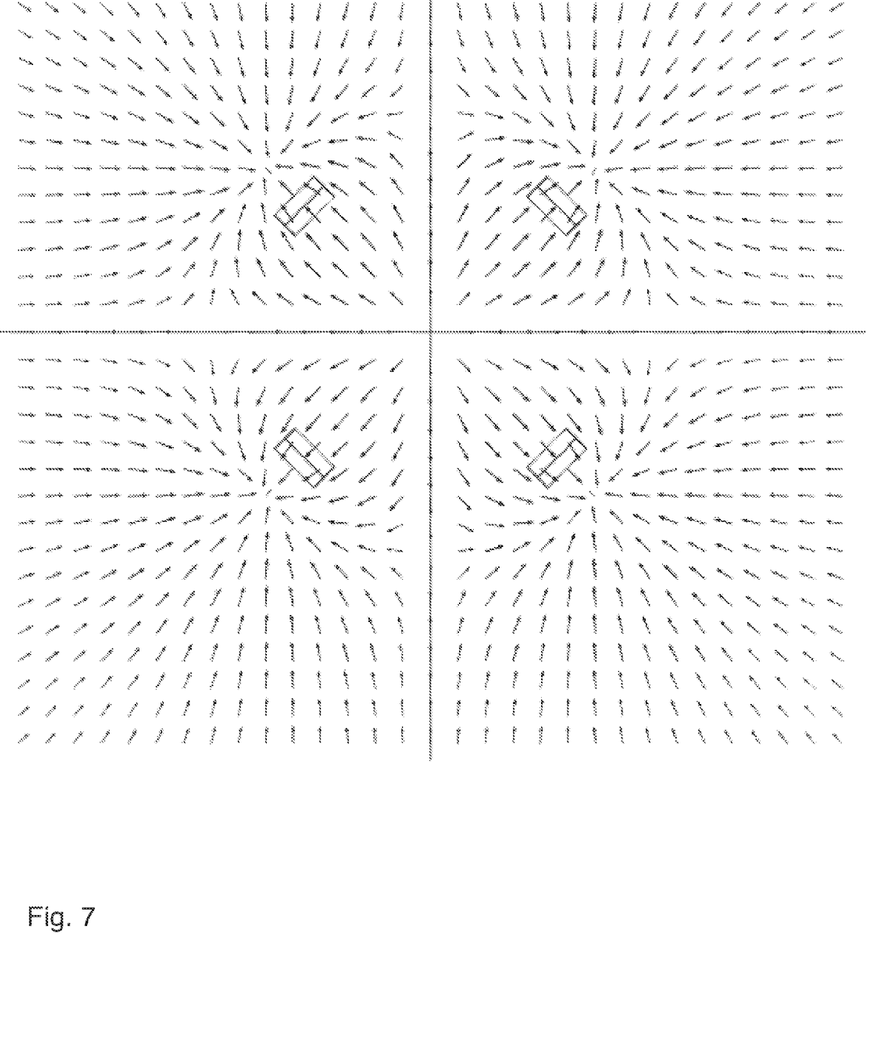
FIG. 7 is a diagram illustrating the magnetic field through a cross-section of an embodiment of a three-dimensional atom trap.

FIG. 7 is a diagram illustrating the magnetic field through a cross-section of an embodiment of a three-dimensional atom trap. In some embodiments, the three-dimensional atom trap is used to implement the three-dimensional atom trap of FIG. 5. In the example shown, the cross-section of the three-dimensional atom trap is taken on a plane placed symmetrically between the upper and lower rings of magnets in FIG. 6a or 6b. The field strength changes approximately linearly in the radial direction and has a zero point in the center. The field strength along the central axis (e.g., from the center point of the first loop of magnets in FIG. 5 to the center point of the second loop of magnets in FIG. 5, and at the center of FIG. 7 along the direction into and out of the page) changes approximately linearly from the top of the trap to the bottom of the trap, with a zero point at the middle, comprising the center (e.g., the trap slows and pushes atoms toward the center where the net force on the atoms approaches zero).

Figure 8A:
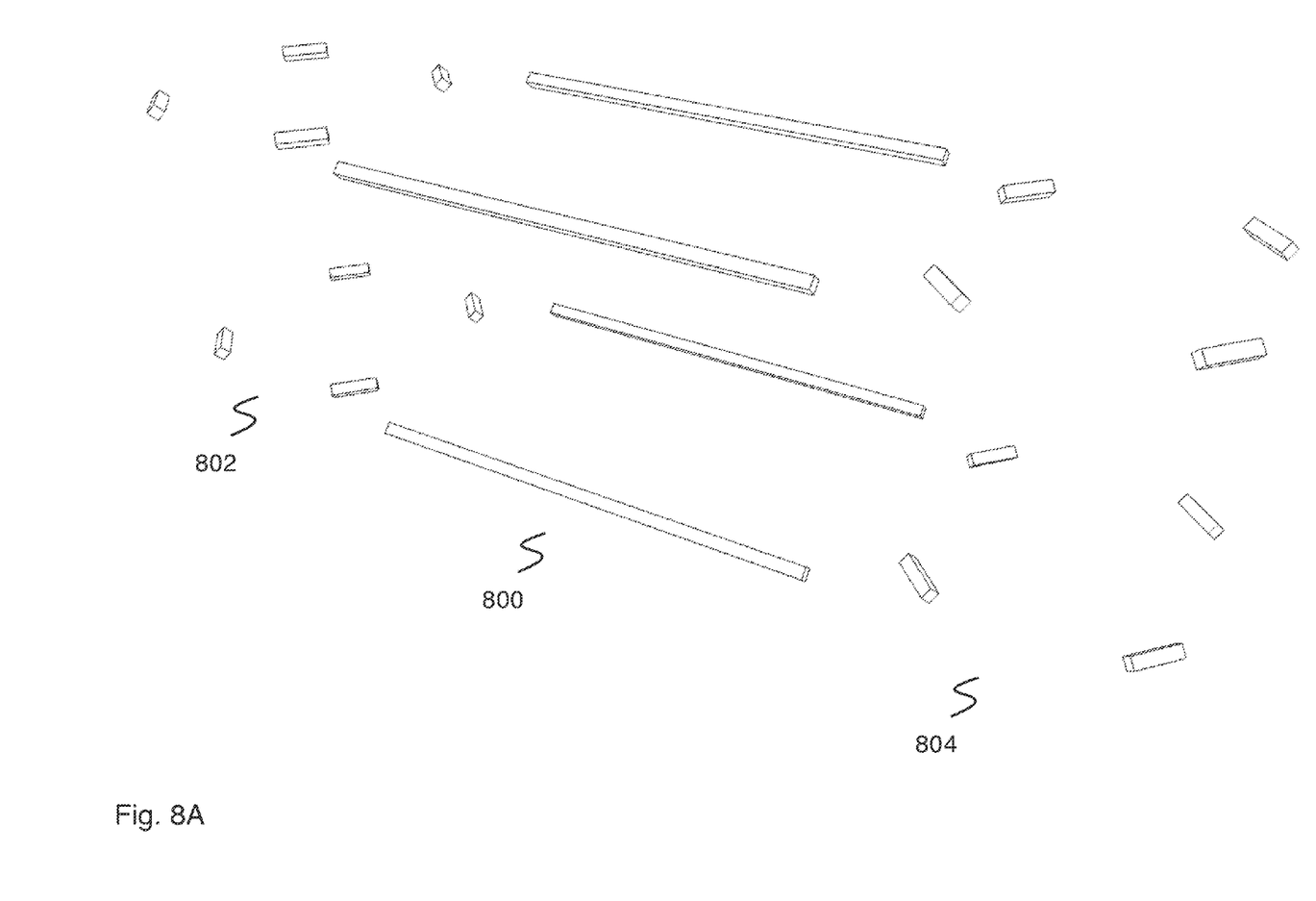
FIG. 8A is a diagram illustrating an embodiment of a two-dimensional atom trap and two three-dimensional atom traps.

FIG. 8A is a diagram illustrating an embodiment of a two-dimensional atom trap and two three-dimensional atom traps. Racetrack mirrors (e.g., mirrors as shown in FIG. 2 and FIG. 5) are not shown. In some embodiments, two-dimensional atom trap 800 comprises the two-dimensional atom trap of FIG. 2. In some embodiments, three-dimensional atom trap 802 and three-dimensional atom trap 804 each comprise the three-dimensional atom trap of FIG. 5. In the example shown, the free axis of two-dimensional atom trap 800 intersects the three-dimensional atom trap 802 and three-dimensional atom trap 804 at opposite ends of two-dimensional atom trap 800. Relative to the axes of the magnets making up two-dimensional atom trap 800, the axes of the magnets making up three-dimensional atom trap 802 and three-dimensional atom trap 804 are positioned rotated (e.g., rotated by a 45 degree angle, a 135 degree angle, a 225 degree angle, 45×N degree angle where N=1, 3, 5, etc.). In some embodiments, the magnetic fields for the two-dimensional and three-dimensional atom traps have the same polarity along one or more coordinate axes. In some embodiments, the two-dimensional and three-dimensional atom traps comprise a magnetic shield comprising one or more layers of one or more materials that surrounds the permanent magnets.

Figure 8B:
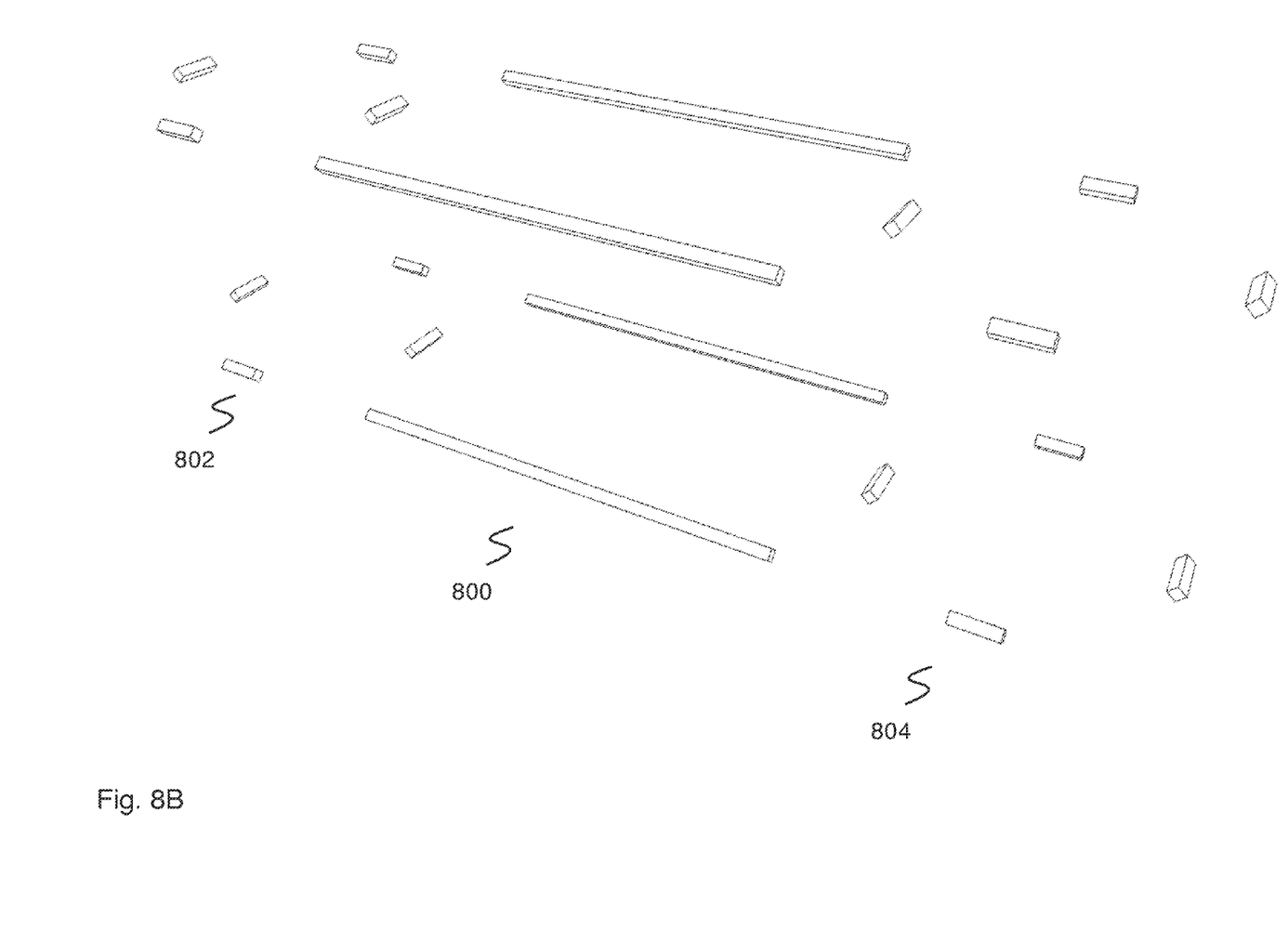
FIG. 8B is a diagram illustrating an embodiment of a two-dimensional atom trap and two three-dimensional atom traps.

FIG. 8B is a diagram illustrating an embodiment of a two-dimensional atom trap and two three-dimensional atom traps. Racetrack mirrors (e.g., mirrors as shown in FIG. 2 and FIG. 5) are not shown. In some embodiments, two-dimensional atom trap 850 comprises the two-dimensional atom trap of FIG. 2. In some embodiments, three-dimensional atom trap 852 and three-dimensional atom trap 854 comprise the three-dimensional atom trap of FIG. 5. In the example shown, the free axis of two-dimensional atom trap 850 intersects the three-dimensional atom trap 852 and three-dimensional atom trap 854 at opposite ends of two-dimensional atom trap 850. Relative to the axes of the magnets comprising two-dimensional atom trap 850, the axes of the magnets making up three-dimensional atom trap 852 and three-dimensional atom trap 854 are positioned rotated (e.g., rotated by a 90 degree angle, a 180 degree angle, a 270 degree angle, a 360 degree angle, a 45×N degree angle where N=0, 2, 4, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A two-dimensional atom trap, comprising:
   three or more permanent magnets arranged around a perimeter of a loop, wherein a plane of the loop is perpendicular to a free axis of the two-dimensional trap, and wherein the three or more permanent magnets bracket an internal volume of the two-dimensional atom trap; and
   one or more laser beam input ports enabling access for one or more laser beams to the internal volume of the two-dimensional atom trap, wherein an optical racetrack guides a laser beam input via a single laser beam input port to traverse a volume of the two-dimensional atom trap from four directions.

2. The two-dimensional atom trap of claim 1, wherein each of the three or more permanent magnets is segmented.

3. The two-dimensional atom trap of claim 1, further comprising one or more nulling permanent magnets, wherein the one or more nulling permanent magnets null a magnetic field produced by the two-dimensional trap in volumes adjacent to the two-dimensional trap.

4. The two-dimensional atom trap of claim 1, wherein the three or more permanent magnets have a long axis of each of the three or more permanent magnets parallel to the free axis of the two-dimensional trap.

5. The two-dimensional atom trap of claim 1, wherein the three or more permanent magnets comprises four permanent magnets extending parallel to the free axis and arranged on each corner of a square with a plane of the square normal to the free axis of the two-dimensional trap.

6. The two-dimensional atom trap of claim 5, wherein a magnetization of each of the four permanent magnets points 90 degrees from the free axis and, wherein two magnets of the four permanent magnets on each side of the square have bilaterally symmetric magnetization relative to the center of the side.

7. The two-dimensional atom trap of claim 6, wherein a magnetization of each of the four permanent magnets is tilted 45 degrees from a side of the square.

8. The two-dimensional atom trap of claim 1, wherein the optical racetrack comprises an odd number of mirrors and an even number of λ/4 waveplates.

9. The two-dimensional atom trap of claim 8, wherein one or more of the even number of λ/4 waveplates is used at substantially non-normal incidence.

10. The two-dimensional atom trap of claim 9, wherein an angle of incidence is approximately 22.5 degrees for the one or more of the even number of λ/4 waveplates.

11. The two-dimensional atom trap of claim 1, wherein the optical racetrack comprises three mirrors and two λ/4 waveplates.

12. The two-dimensional atom trap of claim 1, further comprising a magnetic shield, wherein the magnetic shield comprises one or more layers of one or more magnetic shield materials that surrounds the three or more permanent magnets.

13. The two-dimensional atom trap of claim 1, further comprising a three-dimensional atom trap, wherein a free axis of the two-dimensional atom trap intersects the three-dimensional atom trap.

14. The two-dimensional atom trap of claim 13, wherein the three-dimensional atom trap comprises:
   a first set of permanent magnets positioned along a first perimeter of a first loop; and
   a second set of permanent magnets positioned along a second perimeter of a second loop, wherein the first loop and the second loop bracket an internal volume of the three-dimensional atom trap; and
   one or more laser beam input ports enabling one or more laser beams to access the internal volume of the three-dimensional atom trap.

15. The two-dimensional atom trap of claim 13, wherein a two-dimensional trap magnetic field of the two-dimensional trap and a three-dimensional trap magnetic field of the three-dimensional trap have a same polarity along one or more coordinate axes.

16. The two-dimensional atom trap of claim 1, further comprising two three-dimensional atom traps, wherein a free axis of the two-dimensional trap intersects each of the two three-dimensional atom traps at either or opposite ends of the two-dimensional atom trap.

17. The two-dimensional atom trap of claim 1, wherein the three or more permanent magnets comprise domains written into re-writable magnetic media.

18. A three-dimensional atom trap, comprising:
a first set of permanent magnets positioned along a first perimeter of a first loop; and
a second set of permanent magnets positioned along a second perimeter of a second loop, wherein the first loop and the second loop bracket an internal volume of the three-dimensional atom trap; and
one or more laser beam input ports enabling one or more laser beams to access the internal volume of the three-dimensional atom trap, wherein an optical racetrack guides a laser beam input via a laser beam input port to traverse the internal volume of the three-dimensional atom trap from three or more directions.

19. The three-dimensional atom trap of claim 18, further comprising one or more nulling permanent magnets, wherein the nulling permanent magnets null a magnetic field produced by the three-dimensional trap in volumes adjacent to the three-dimensional trap.

20. The three-dimensional atom trap of claim 18, wherein each magnet of the first set of permanent magnets has a magnetization perpendicular to the first perimeter and tilted 45 degrees away from the plane containing the first perimeter and each magnet of the second set of permanent magnets has a magnetization perpendicular to the second perimeter and tilted 45 degrees away from the plane containing the second perimeter.

21. The three-dimensional atom trap of claim 18, wherein at least one of: the first set of permanent magnets or the second set of permanent magnets comprises two or more permanent magnets.

22. The three-dimensional atom trap of claim 18, wherein at least one set of: the first set of permanent magnets or the second set of permanent magnets comprises four permanent magnets.

23. The three-dimensional atom trap of claim 18, wherein the first loop and the second loop are substantially parallel.

24. The three-dimensional atom trap of claim 18, wherein the first loop and the second loop are substantially coaxial.

25. The three-dimensional atom trap of claim 24, wherein each magnet of at least one of the first set of permanent magnets or the second set of permanent magnets has a magnetization perpendicular to either the first perimeter or the second perimeter of the corresponding first loop or second loop and tilted 45 degrees away from a plane of the corresponding first loop or the second loop, away from a center and toward an axis of the corresponding first loop or the second loop.

26. The three-dimensional atom trap of claim 25, wherein each magnet of at least one of the first set of permanent magnets or the second set of permanent magnets has a magnetization perpendicular to either the perimeter or the second perimeter of the corresponding first loop or the second loop and tilted 45 degrees away from a plane of the corresponding first loop or the second loop, toward a center and away from an axis of the corresponding first loop or the second loop.

27. The three-dimensional atom trap of claim 18, wherein an optical racetrack guides a laser beam input via a laser beam input port to traverse the internal volume of the three-dimensional atom trap from six directions.

28. The three-dimensional atom trap of claim 27, wherein the optical racetrack comprises an odd number of mirrors and an even number of $\lambda/4$ waveplates.

29. The three-dimensional atom trap of claim 28, wherein one or more of the even number of $\lambda/4$ waveplates is used at substantially non-normal incidence.

30. The three-dimensional atom trap of claim 29, wherein an angle of incidence is approximately 22.5 degrees for the one or more of the even number of $\lambda/4$ waveplates.

31. The three-dimensional atom trap of claim 27, wherein the racetrack comprises five mirrors and two $\lambda/4$ waveplates.

32. The three-dimensional atom trap of claim 18, further comprising a magnetic shield comprising one or more layers of one or more materials that surrounds the first set of permanent magnets and the second set of permanent magnets.

33. The three-dimensional atom trap of claim 18, wherein the first set of permanent magnets or the second set of permanent magnets comprise domains written into re-writable magnetic media.

34. The three-dimensional atom trap of claim 18, further comprising a magnetic shield comprising one or more layers of one or more materials that surrounds the first set of permanent magnets and the second set of permanent magnets.

* * * * *